HANS SCHANZ
INVENTOR.

BY Karl F. Ross

ATTORNEY

HANS SCHANZ
INVENTOR.

BY Karl F. Ross
ATTORNEY

3,476,221
PISTON-CYLINDER ASSEMBLY WITH SEAL MEANS AND CORROSION PREVENTING MEANS THEREFOR
Hans Schanz, Gifhorn, Germany, assignor to Alfred Teves G.m.b.H., Frankfurt am Main, Germany, a corporation of Germany
Filed Feb. 26, 1968, Ser. No. 708,017
Claims priority, application Germany, Mar. 7, 1967, T 33,372
Int. Cl. B60t 11/10; F16j 15/00
U.S. Cl. 188—152      3 Claims

ABSTRACT OF THE DISCLOSURE

A hydraulic-cylinder arrangement for a disk brake in which the cylinder bore guiding the piston opens in the direction of the brake disk and the bore has an enlarged-diameter portion forming an annular clearance with the periphery of the piston adjacent the mouth of the cylinder to prevent damage to the sliding surfaces of the piston and cylinder because of distortion or deflection of the yoke and piston during the brake operation. The enlarged-diameter portion of the bore reaches back substantially to the region of the seal between the co-operating surfaces in the most advanced position of the piston.

---

My present invention relates to a hydraulic cylinder arrangement for a hydraulic brake and, more particularly, to a wheel-brake cylinder for a disk-brake system.

In a disk-brake arrangement, it is common practice to provide a brake yoke which is affixed or otherwise mounted upon a nonrotatable portion of the vehicle, e.g. the axle housing, while a rotatable disk is coupled with the wheel and passes between the lobes of the yoke. One of the lobes, or both, may be provided with a wheel-brake cylinder in which a piston is shiftable perpendicularly to the braking faces of the disk to drive a respective brakeshoe thereagainst. The brakeshoe may comprise a backing plate, lying in a plane perpendicularly to the axis of the wheel-brake cylinder, upon which is mounted a brake lining juxtaposed with an annular braking face of the disk. When a pair of such wheel-brake cylinders is provided in the yoke, the yoke may be stationary with respect to movement toward and away from the disk. However, it is also possible to use a single wheel-brake cylinder or to provide the wheel-brake cylinder on only one side of the disk when the other lobe of the yoke receives a reaction force via movement of the yoke in the direction of brakeshoe displacement. While reference is made hereinafter to "wheel-brake cylinders" and like structures, it will be understood that the present invention is applicable to brake systems apart from those of automotive vehicles and is applicable to any system in which a follower or slave piston is controlled by a servo-master cylinder connected with the slave cylinder by a hydraulic transmission line.

In all such systems, the cylinder is provided with an axially extending guide bore terminating at the open end of the cylinder turned toward the brake disk and through which the piston may extend and is axially shiftable. A seal is commonly provided between the cylinder or piston member and the guide surface formed by the other member to prevent leakage of hydraulic fluid past the piston. In conventional arrangements, substantial problems may arise from the fact that the guide surface of the piston normally projects axially beyond the cylinder wall and is there subjected to corrosion, contamination and wear which, in turn, cause the deterioration of the seal as the piston withdraws into the cylinder bore. This problem cannot effectively be solved merely by extending the cylinder bore to the region at which the piston engages the backing plate of the brakeshoe because a certain amount of tilting, canting or distortion of the piston must be accommodated if binding of the piston-and-cylinder arrangement is not to develop as the yoke and piston yield with more or less flexibility under the substantial forces applied during brake operation.

For example, when the cylinder bore extends close to the brakeshoe, as is the case in conventional systems where the flank of the lobe juxtaposed with the disk is to serve as a stop for the brakeshoe in its retracted position, the twisting of the yoke gives rise to a canting of the piston such that its sealing surface engages the lip or rim of the cylinder along the edge of the cylinder bore causing damage to the wall of the piston and to the mouth of the bore. The friction force retarding axial displacement of the piston is thereby increased as is wear of the damaged surface. Similar problems arise from distortion of the piston during brake operation. It will be appreciated that the problem becomes even more significant when, in accordance with usual practices, the piston structure is provided galvanically with a chromium plating or the like as an anticorrosion technique, the hard-chromium coating being engaged by the edge of the bore. When the bore itself is coated with an anticorrosion antifriction cadmium layer, the distortion of the yoke in combination with axial movement of the piston may suffice to shave the protective coating away from the wall in the region of the mouth of the bore, thereby permitting corrosion of freshly exposed surfaces and possible freezing of the piston by such corrosion.

It is, therefore, the principal object of my present invention to provide an improved wheel-brake cylinder for this disk-type automotive-vehicle brakes and the like whereby the aforementioned disadvantages can be avoided.

A further object of this invention is to provide a wheel-brake cylinder for automotive disk brakes which prevents damage to the coated mutually co-operating slide surfaces of the piston and cylinder upon deflection of the yoke or distortion of the piston.

These objects and others which will be apparent hereinafter are attained, in accordance with the present invention, by providing a wheel-brake cylinder which in the region of the mouth of the guide bore of the cylinder, whose open end is turned toward the brake disk and the brakeshoe associated with the piston slidable in this bore, is formed with an enlarged-diameter step or recess extending substantially directly up to the sealing ring when the latter is provided in a groove in the inner wall of the bore, this enlarged portion of the bore forming a peripheral clearance about the guide surface of the piston. Thus, the cylinder has an axially extending enlarged-diameter step running substantially in the axial direction from the sealing ring (in the most forwardly position of the piston corresponding to brake application) toward the brakeshoe associated with this piston, the diameter of this step being larger than the uniform diameter of the balance of the guide bore of the cylinder. In the case of a wheel-brake cylinder in which the sealing ring is received in a groove along the inner wall of the cylinder and thus a recess in the guide bore, the step is located between the axial end or mouth of the cylinder turned toward the brakeshoe and a location along the wall of the guide bore which is close to the groove in which the seal is seated. The expression "close to" refers to a spacing from the groove which is equal to or less than the difference in diameter of the larger diameter step and the uniform by the smaller diameter of the main portion of the guide bore and is usually also less than the total axial length of this large diameter step.

The advantage of this configuration of the piston and cylinder arrangement is that the edge of the piston, upon canting of the piston with nonuniform deformation or yielding of the piston, does not engage the wall of the bore nor is the finely finished periphery of the piston damaged by being drawn across the sharp edge at the mouth of the cylinder bore. The force required to displace the piston remains more or less constant and does not vary as in earlier systems where sharp edges from time to time engaged one or another of the highly polished guide surfaces or disengaged such surfaces. Furthermore, the present invention is particularly applicable to systems in which these highly finished guide surfaces are coated with anticorrosion protective layers and it has been found that the present system in a relatively simple fashion eliminates all fear of damage to the soft cadmium layer coating the interior of the bore or the hard chromium layer coating the periphery of the piston. Preferably, the spacing of the large-diameter step of the bore from the groove is designed only to prevent damage to the sealing ring and is as close as possible to the latter while the axial length of this step is so dimensioned with respect to the location of the edge of the piston as to have this edge lying within the region of the step in all operative positions of the piston.

The above and other objects, features and advantages of the present invention will become more readily apparent from the following description, reference being made to the accompanying drawing in which.

Figure 1:
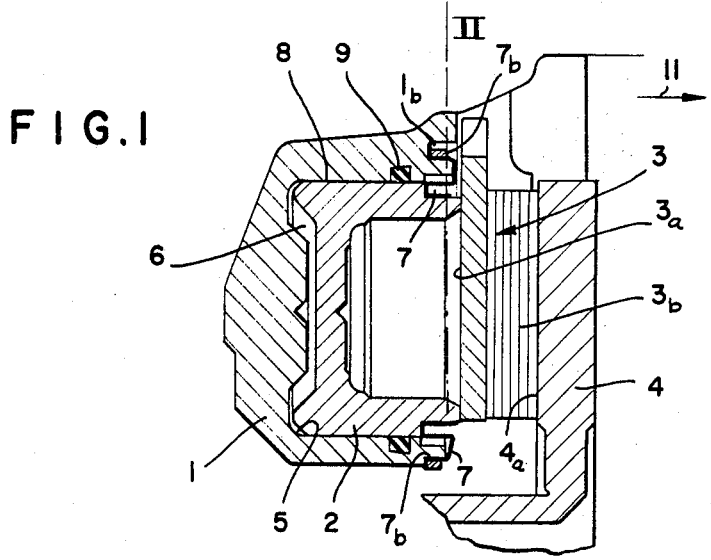
FIG. 1 is an axial cross-sectional view through a portion of a wheel-brake cylinder of a disk brake embodying the present invention.
Figure 2:
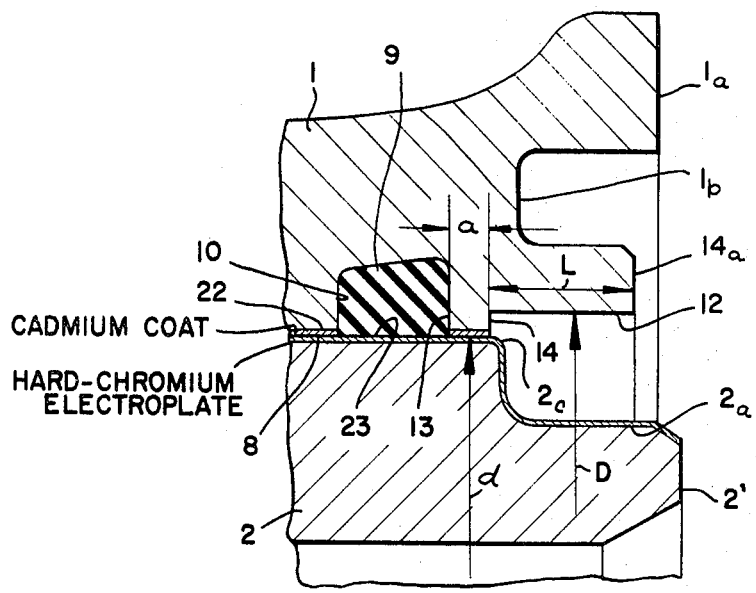
FIG. 2 is a detail view of the region II of FIG. 1, the dust-excluding sleeve being omitted.

In FIG. 1, I show a portion of a disk-brake system whose yoke is affixed to the axle housing at a location at the right-hand side of the brake in the conventional manner and has a lobe 1 forming a wheel-brake cylinder. The wheel-brake cylinder is constituted as a guide bore 5 which, as is apparent from FIG. 2, is lined with a relatively soft, e.g. cadmium, coating 22 for anticorrosion and antifriction purposes. Within this bore, a piston 2 is axially shiftable upon the delivery of hydraulic fluid from a conventional transmission line and master cylinder (operated by the brake pedal) to the working chamber 6 of the wheel-brake cylinder behind the piston. The latter is cylindrical and generally cup-shaped while opening in the direction of a brake disk 4 attached to the wheel of the vehicle and passing between the lobes of the yoke only one of which is shown in FIG. 1.

The piston 2 has an annular bearing surface 2' (FIG. 2) which abuts the backing plate 3a of a brakeshoe 3 whose lining 3b is bonded to the backing plate and is engageable with the brake face 4a of the disk. In its retracted position, the backing plate of the brakeshoe 3 rests against the surface 1a of the lobe which extends beyond the mouth of the guide bore, the surface 1a lifting the brakeshoe from the piston 2 when the latter is in its extreme left-hand position. When the brake fluid is delivered to the working chamber 6 of the cylinder, the piston is displaced to the right (arrow 11) to drive the brakeshoe 3 against the disk and frictionally reduce the speed of the latter, thereby braking the wheel. The guide rods and other retaining elements constraining the brakeshoe 3 to axial displacement are not shown here.

At its forward end, the piston 2 is provided with a circumferential recess 2a receiving a U-shaped portion 7a of a cap or sleeve 7 composed of elastomeric material and having a bead 7b received in a further recess 1b of the yoke 1 surrounding the guide bore 6, the sleeve 7b preventing the entry of dust and other contaminants between the guide surfaces of the piston and the cylinder. The guide surface of the piston is represented at 8 while the guide surface of the piston co-operating therewith is represented at 23 and is defined by a hard chromium electroplated coating 24 of conventional character. The seal between these guide surfaces is constituted by a ring 9 of generally trapezoidal cross-section which is received in a groove 10 formed in the inner wall 8 of the guide bore 5 and slidably engaging the highly polished surface 23 of the piston.

According to a principal feature of this invention, the region of the mouth of the guide bore 5 at which the latter terminates proximal to the brakeshoe 3 is formed with an axially extending enlargement or step of the bore as represented at 12, this step extending approximately to the forward wall 13 of the groove 10 and spaced therefrom only by an amount sufficient to prevent damage to the sealing ring 9. This construction is clearly shown in FIG. 2 in which it may be seen that the enlarged portion 12 of the guide bore has a diameter D exceeding the diameter $d$ of the remainder of the guide bore and the corresponding surface of the piston. This enlarged-diameter portion of the bore extends between a flank 14a of the cylinder constituting the actual mouth thereof proximal to the brakeshoe and a location 14 close to the flank 13 of the groove 10. The axial length L of this step is dimensioned with respect to the stroke of the edge 2c of the guide surface 23 of the piston to ensure that this edge is always located between the surfaces 14a and 14 in all operative positions of the piston 2. The distance $a$ between the flank 13 of the groove and the flank 14 at the beginning of the guide bore is only sufficient to prevent the sealing ring 9 from frictional deterioration, this distance being equal to or less than the difference $D-d$ mentioned earlier and being also a small fraction of the axial length L of the step 12.

Figure 3:
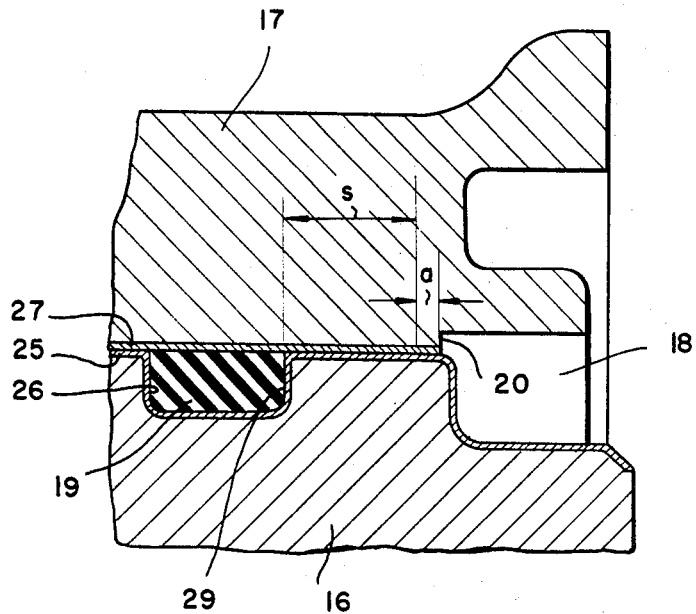
FIG. 3 is a cross-sectional view similar to FIG. 2 of another embodiment of this invention.

In the embodiment of FIG. 3, the piston 16 is again provided with a coating 25 of hard chromium electroplate but is here formed with an outwardly open peripheral groove 26 in which the sealing ring 9 is disposed. The polished inner wall surface of the cylinder bore is provided with a cadmium coating 27 slidably engaged by the seal 19 and terminating at a flank 20 of the widened portion 18 whose diameter D exceeds the diameter $d$ of the remainder of the guide bore. The effective stroke of the piston may be represented by the distance S corresponding to the difference between the distance of flank 20 from the leading flank 29 of the groove 26 and the distance as previously discussed. In this case, in the effective position of the piston 16, in its extreme right-hand position, the flank 29 of the groove 26 lies close to the beginning (flank 20) of the enlarged diameter step and is separated therefrom by a minimum distance sufficient only to prevent deterioration of the sealing ring 19. In both cases neither edge of the guide surface (of the cylinder or piston) engages the other guide surface to change the characteristics associated with axial displacement of the piston or is capable of damaging the coated guide surfaces.

The invention described and illustrated is believed to admit of many modifications within the ability of persons skilled in the art.

I claim:

1. In a hydraulically operated piston-and-cylinder arrangement comprising a housing forming a hydraulically pressurizable cylinder member in the form of a guide bore open in one direction, a piston member extending into said guide bore through the open end thereof and axially shiftable in said guide bore for operating a load upon hydraulic displacement of said piston in said one direction, said piston member and said guide bore being formed substantially throughout their lengths with juxtaposed cylindrical guide surfaces of mutual sliding engagement, and sealing means between said surfaces, said sealing means including a circumferential groove sunk in one of said surfaces and an elastomeric sealing ring received in said groove and bearing upon the other of said surfaces, one of said members having an edge sweeping past the said surface of the other of said members upon axial movement of the surface of the piston member outwardly through and inwardly into said open end of said bore, the improvement wherein:

said surface of said other of said members is formed with a corrosion-resistant metallic coating slidably engageable with the surface of said one of said members;

said other of said members is formed with an axially extending step at said open end recessed radially away from said edge and coaxial therewith; and said cylinder member is formed with an annular channel coaxially outwardly of said bore and open in said direction, said arrangement further comprising a sealing cuff anchored in said channel to said cylinder member and hugging said piston member, said step extending axially from the open end of said bore substantially to the region of said groove at least in an extreme position of said piston member upon its displacement in said direction.

2. The improvement defined in claim 1 wherein said step is an enlarged-diameter step of said bore and terminates at a distance from said groove in said extreme position of said piston member equal at most to the difference by which said step is enlarged in diameter over the diameter of the remainder of said guide bore, said surface of said bore being formed with a galvanically applied cadmium coating, said corrosion-resistant metallic coating being a hard chromium coating galvanically applied to said piston member.

3. The improvement defined in claim 2 wherein said housing is a disk-brake yoke, said cylinder is a wheel-brake cylinder of an automotive disk brake, said piston member is a cup-shaped piston having an annular bearing face in said direction, said load is a brakeshoe engageable by said bearing face of said piston having a reduced-diameter step adjacent said bearing face and hugged by said cuff, said groove being formed in said guide surface of said bore, said guide surface of said piston having a leading edge in said direction constituting the first-mentioned edge and lying within the axial extent of said step in all operative positions of said piston.

References Cited
UNITED STATES PATENTS

| | | | |
|---|---|---|---|
| 1,856,272 | 5/1932 | Summers | 92—223 |
| 2,201,405 | 5/1940 | McCarroll | 92—223 |
| 2,410,405 | 11/1946 | Cornelius | 92—223 X |
| 2,756,844 | 7/1956 | Chamberlain et al. | 188—152 X |
| 3,100,553 | 8/1963 | Butler | 188—152 X |
| 3,139,157 | 6/1964 | Hodkinson | 92—165 X |

GEORGE E. A. HALVOSA, Primary Examiner

U.S. Cl. X.R.

92—165, 169, 172, 223; 188—264